(12) United States Patent
Kasamatsu

(10) Patent No.: US 10,496,240 B2
(45) Date of Patent: Dec. 3, 2019

(54) DISPLAY CONTROLLING DEVICE, METHOD OF CONTROLLING DISPLAY CONTROLLING DEVICE, AND NON-TRANSITORY COMPUTER-READABLE RECORDING MEDIUM STORING INSTRUCTIONS THEREFOR

(71) Applicant: BROTHER KOGYO KABUSHIKI KAISHA, Nagoya, Aichi (JP)

(72) Inventor: Daisuke Kasamatsu, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/884,913

(22) Filed: Jan. 31, 2018

(65) Prior Publication Data

US 2018/0232126 A1 Aug. 16, 2018

(30) Foreign Application Priority Data

Feb. 10, 2017 (JP) .................................. 2017-023302

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 1/3215* (2013.01); *G06F 1/3265* (2013.01); *G06F 1/3284* (2013.01); *G06F 3/0416* (2013.01); *G06F 3/0483* (2013.01); *G06F 3/0489* (2013.01); *G06F 3/04886* (2013.01); *G06F 3/1201* (2013.01); *G06F 3/1221* (2013.01);
(Continued)

(58) Field of Classification Search
None
See application file for complete search history.

(56) References Cited

U.S. PATENT DOCUMENTS

2009/0262379 A1* 10/2009 Miyake .............. G03G 15/5004
358/1.13
2010/0245910 A1* 9/2010 Maeda .................. G06F 3/1217
358/1.15
(Continued)

FOREIGN PATENT DOCUMENTS

JP 2008-278105 A 11/2008

*Primary Examiner* — William C Trapanese
(74) *Attorney, Agent, or Firm* — Scully, Scott, Murphy & Presser P.C.

(57) ABSTRACT

A controller of a display controlling device is configured to display, on a display, a standby screen including multiple tabs, one of which is selectable, and a tab screen corresponding to a selected tab, at least one of the multiple hard keys serving as a tab-registered key associated with one of the multiple tabs, operate the display controlling device in a sleep mode in which the standby screen is not displayed. In response to a particular sleep condition being satisfied, the controller changes an operation mode of the display controlling device to the sleep mode, and in response to depression of the tab-registered key when the display controlling device operate in the sleep mode, the controller recovers from the sleep mode by changing the sleep mode and displaying the standby screen including the tab screen corresponding to the tab associated with the depressed tab-registered key on the display.

20 Claims, 6 Drawing Sheets

(51) Int. Cl.
  *G06F 3/12* (2006.01)
  *G06F 1/3234* (2019.01)
  *G06F 3/041* (2006.01)
  *G06F 3/0489* (2013.01)
  *G06F 1/3215* (2019.01)
  *G06F 3/0483* (2013.01)
  *G06F 3/0488* (2013.01)
  *H04N 1/00* (2006.01)

(52) U.S. Cl.
  CPC ....... *G06F 3/1229* (2013.01); *H04N 1/00389* (2013.01); *H04N 1/00411* (2013.01); *H04N 1/00413* (2013.01); *H04N 1/00424* (2013.01); *H04N 1/00435* (2013.01); *H04N 1/00474* (2013.01); *H04N 1/00482* (2013.01); *H04N 1/00514* (2013.01); *G06F 1/3262* (2013.01); *H04N 2201/0094* (2013.01)

(56) References Cited

U.S. PATENT DOCUMENTS

2011/0280435 A1* 11/2011 Chiba ................ H04N 1/00389
  382/100
2016/0034105 A1* 2/2016 Yamashirodani ..... G06F 3/0418
  345/173

* cited by examiner

DISPLAY CONTROLLING DEVICE, METHOD OF CONTROLLING DISPLAY CONTROLLING DEVICE, AND NON-TRANSITORY COMPUTER-READABLE RECORDING MEDIUM STORING INSTRUCTIONS THEREFOR

CROSS-REFERENCE TO RELATED APPLICATIONS

This application claims priority under 35 U.S.C. § 119 from Japanese Patent Application No. 2017-023302 filed on Feb. 10, 2017. The entire subject matter of the application is incorporated herein by reference.

BACKGROUND

Technical Field

The present disclosures relate to a technique to control a screen displayed on a display of a display controlling device.

Related Art

Various devices configured to display a so-called tabbed-multiscreen form standby screen on a touch panel have been known. Such a tabbed multi-screen form screen has multiple tabs, and by switching the tabs, contents of the screen are switched.

In the device of the above-described type, the standby screen firstly displayed after the device is powered on is typically a default screen which is a particular one of the multiple standby screens respectively corresponding the multiple tabs.

Further, among such type of devices, there is known a device in which, when a sleep condition is satisfied, an operation status of the device changes to a sleep state, and the touch panel becomes non-display state.

In the devices in which that touch panel become the non-display state in the sleep state, when a hard key is depressed or the touch panel in the non-display status is touched by the user, recovery condition is satisfied, the sleep state is released and the device is restored to operate in a normal operation state.

When the operation state is recovered from the sleep state, typically, the default standby screen is displayed as the standby screen which is firstly displayed on the touch panel. For another example, there could be configuration to display a standby screen corresponding to the operation state immediately before the operation state transited to the sleep state.

SUMMARY

When the device is in the sleep state, and a user wishes to use the device with a particular standby screen, which is different from the default standby screen, being displayed, it is very convenient for the user that the desired standby screen is displayed as soon as possible.

When the device is configured such that the default standby screen is displayed immediately after a recovery from the sleep state, it becomes necessary for the user to operate a tab in the standby screen to switch the screen from the default standby screen to the desired standby screen after causing the device to recover from the sleep state.

When the device is configured to display the screen corresponding to the operation state immediately before the operation state transited to the sleep state, the standby screen which is displayed immediately after recovery from the sleep state is not necessarily the user-desired standby screen. When the standby screen different from the desired standby screen is displayed, the user is required to operate the tab to switch the standby screens.

According to aspects of the disclosures, there is provided a display controlling device, which has a display, an input part including multiple hard keys, and a controller. The controller is configured to display a standby screen on the display, the standby screen including multiple tabs, one of which is selectable, and a tab screen corresponding to a selected one of the multiple tabs, at least one of the multiple hard keys serving as a tab-registered key which is associated with one of the multiple tabs, operate the display controlling device in a sleep mode in which the standby screen is not displayed on the display. In response to a particular sleep condition being satisfied, the controller changes an operation mode of the display controlling device to the sleep mode; and in response to depression of the tab-registered key when the operation mode of the display controlling device is the sleep mode, the controller recovers from the sleep mode by changing the sleep mode and displaying the standby screen including the tab screen corresponding to the tab associated with the depressed tab-registered key on the display.

According to aspects of the disclosures, there is provided a method of controlling a display controlling device having a display and multiple hard keys. The method includes displaying a standby screen on the display, the standby screen including multiple tabs, one of which is selectable, and a tab screen corresponding to a selected one of the multiple tabs, at least one of the multiple hard keys serving as a tab-registered key which is associated with one of the multiple tabs, operating the display controlling device in a sleep mode in which the standby screen is not displayed on the display, in response to a particular sleep condition being satisfied, changing an operation mode of the display controlling device to the sleep mode, and, in response to depression of the tab-registered key when the operation mode of the display controlling device is the sleep mode, recovering from the sleep mode by changing the sleep mode and displaying the standby screen including the tab screen corresponding to the tab associated with the depressed tab-registered key on the display.

According to aspects of the disclosures, there is provided a non-transitory computer-readable recording medium for a display controlling device having a display, an input part including multiple hard keys, and a controller. The recording medium stores computer-readable instructions which cause, when executed by the controller, the display controlling device to display a standby screen on the display, the standby screen including multiple tabs, one of which is selectable, and a tab screen corresponding to a selected one of the multiple tabs, at least one of the multiple hard keys serving as a tab-registered key which is associated with one of the multiple tabs, operate the display controlling device in a sleep mode in which the standby screen is not displayed on the display, in response to a particular sleep condition being satisfied, change an operation mode of the display controlling device to the sleep mode, and in response to depression of the tab-registered key when the operation mode of the display controlling device is the sleep mode, recover from the sleep mode by changing the sleep mode and displaying the standby screen including the tab screen corresponding to the tab associated with the depressed tab-registered key on the display.

BRIEF DESCRIPTION OF THE ACCOMPANYING DRAWINGS

DETAILED DESCRIPTION OF THE EMBODIMENTS

Hereinafter, referring to the accompanying drawings, illustrative embodiments of the present disclosures will be described.

1. First Illustrative Embodiment (1-1) Configuration of Function Execution Device A function execution device 10 according to a first illustrative embodiment shown in FIG. 1 has multiple functions including a scan function to read an image on an original and generate image data representing the read image, a print function to print an image on a printing sheet, a copy function to print an image read by the scan function onto the printing sheet by the print function, and a facsimile function to transmit/receive facsimile data.

Figure 1:
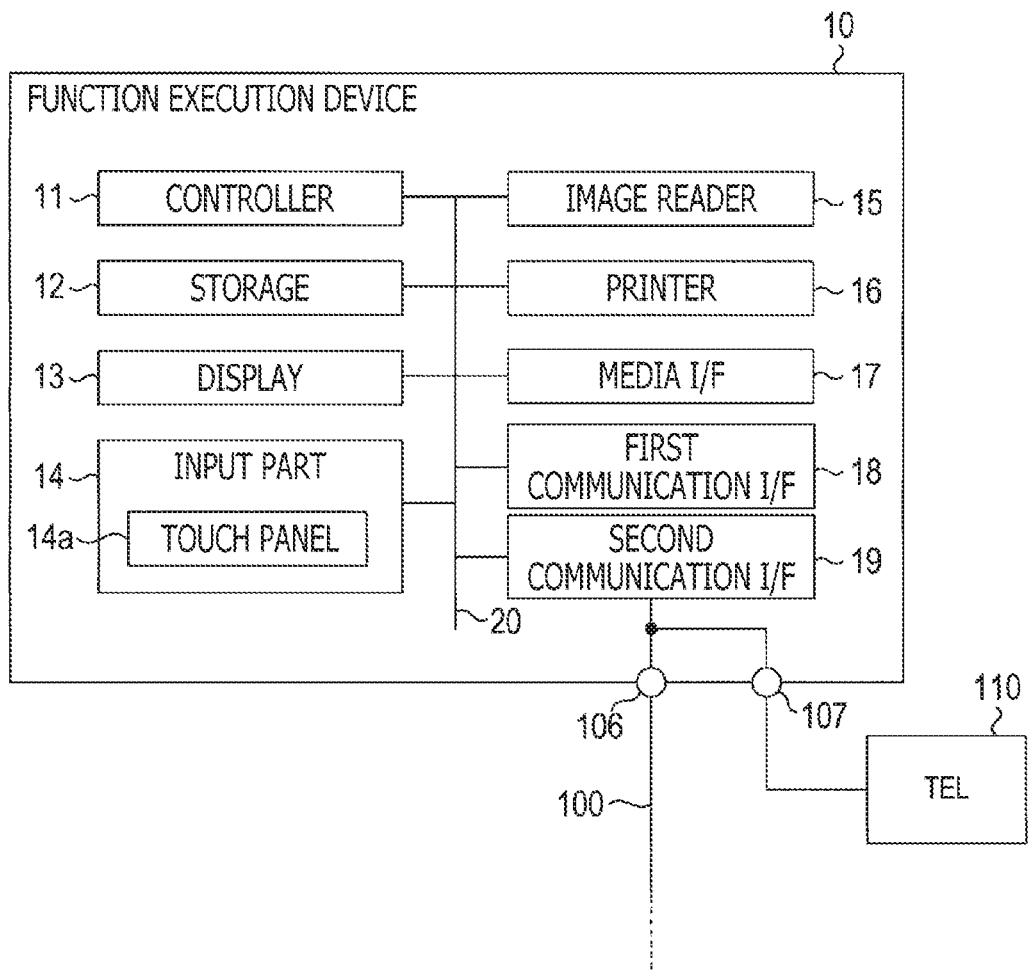
FIG. 1 is a block diagram showing a functional configuration of a function execution device according to an illustrative embodiment of the disclosures.

The function execution device 10 has, as shown in FIG. 1, a controller 11, a storage 12, a display 13, an input part 14, an image reader 15, a printer 16, a media I/F 17, a first communication I/F 18 and a second communication I/F 19, which are interconnected via a bus 20.

The controller 11 has a CPU. The storage 12 includes semiconductor memories such as a ROM, a RAM, an NVRAM, a flash memory and the like. It could be said that the function execution device 10 is provide with a microcomputer including the CPU and semiconductor memories.

The controller 11 realizes various functions by executing programs stored in a non-transitory recording medium. According to the illustrative embodiment, the storage 12 is an example of the non-transitory recording medium storing the programs, or computer executable instructions. It is noted that the various functions, which are realized by the controller 11 according to the illustrative embodiment, are not necessarily be realized by execution of the programs. A part of or all of the functions may be realized with used of a plurality of hardware.

The storage 12 stores data of various screens, including the standby screen 25 (see FIG. 2), to be displayed on the display 13. Further, the storage 12 also stores the programs for a main control process (see FIG. 3) and a custom mode transit process (see FIG. 4). The programs realizing the respective functions described above may be included in the program of the main control process, or provided as separate programs.

The display 13 has a device configured to display an image such as a liquid crystal display or an organic EL display. The input part 14 has an input device through which various input operations of a user are accepted. The input device which the input part 14 has includes a power button 5 (see FIG. 2), a numeric keypad 6, a return button 7, a home button 8, a stop button 9 and a touch panel 14a. The touch panel 14a is arranged on an image display area of the display device of the display 13.

The touch panel 14a is configured to detect a designating operation by contact or proximity of a designation body onto an image display area of the display 13. The touch panel 14a is configured such that, when an instruction operation using the designating body is performed on the image display area of the display 13, the touch panel 14a outputs position information indicating a position at which the designating body is located. According to the illustrative embodiment, that touch panel 14a continuously or periodically outputs the position information when the designating operation with use of the designating body is being performed. It is noted that the touch panel 14a may be configured to detect, as the designating operation, only a contact of the designating body, only proximity of the designation body, or both the contact and proximity of the designating body.

The controller 11 obtains the position information output by the touch panel 14a, and based on the obtained position information, presence/absence of the designating operation of the designating body, the designated position when the designating operation is performed, and at least one particular operation by the designating body when the designating operation is performed.

The operations the controller 11 can detect include at least a tap operation which is an operation of releasing the designating body at the same position where the designating operation with use of the designating body is performed. Various concrete aspects of the designating body used to perform the designating operations can be considered. For example, the designating body may be a tip of a finger, or a particular designating device such as a stylus pen.

The image reader 15 has an image sensor, and configured to read an image on the original and generates image data representing the read image. Optionally, the image reader is provided with an ADF (automatic document feeder). Further optionally, the image reader 15 may be configured to execute a double-sided scanning to read images on both sides of the original set to the platen or the ADF.

The printer 16 has a printing mechanism for printing an image on a printing sheet in accordance with an inkjet printing technology or an electrophotographic printing technology. Optionally, the printer 16 may be configured to perform a double-sided printing to print images on both sides of the printing sheet.

The media I/F 17 is an interface to which various recoding media such as a USB flash memory are coupled. The media I/F 17 controls reading and writing of data with respect to the recording medium coupled thereto.

The first communication I/F 18 is a communication interface configure to connect the function execution device 10 to an external device via a network for data communication. The first communication I/F 18 may be configured to be connectable with at least one of various types of networks such as a wired LAN, a wireless LAN or the Internet. Optionally, the function execution device 10 may be configured to execute a data communication with various information processing devices such as a personal computer, a smartphone, a tablet terminal and the like through the first communication I/F 18, with or without wires. Further optionally, the function execution device 10 may be configured to be connected to the Internet through the first communication I/F 18 and may execute the data communication with various servers and/or information processing devices through the Internet.

The second communication I/F 19 is an communication interface for communicating with external equipment through a communication network 100. The communication network 100 connected to the second communication I/F 19 is, according to the illustrative embodiment, for example, a public telephone network. Transmission/reception of facsimile data by the facsimile function is executed basically through the second communication I/F 19.

The function execution device 10 has a network side jack 106 for connecting to the external equipment through the communication network 100, and a telephone side jack 107 for connecting an externally attached telephone 110. The jacks 106 and 107 are configured as modular jacks having the same shape. The second communication I/F 19 is connected to each of the jack 106 and 107.

The second communication I/F 19 is connected to the communication network 100 through the network side jack 106. When the externally attached telephone 110 is connected to the telephone side jack 107, the second communication I/F 19 is connected to the externally attached telephone 110 through the telephone side jack 107. Further, the externally attached telephone 110 is directly connected to the communication network 100 through the telephone side jack 107 and the network side jack 106.

(1-2) Configuration of Operation Panel

Figure 2:
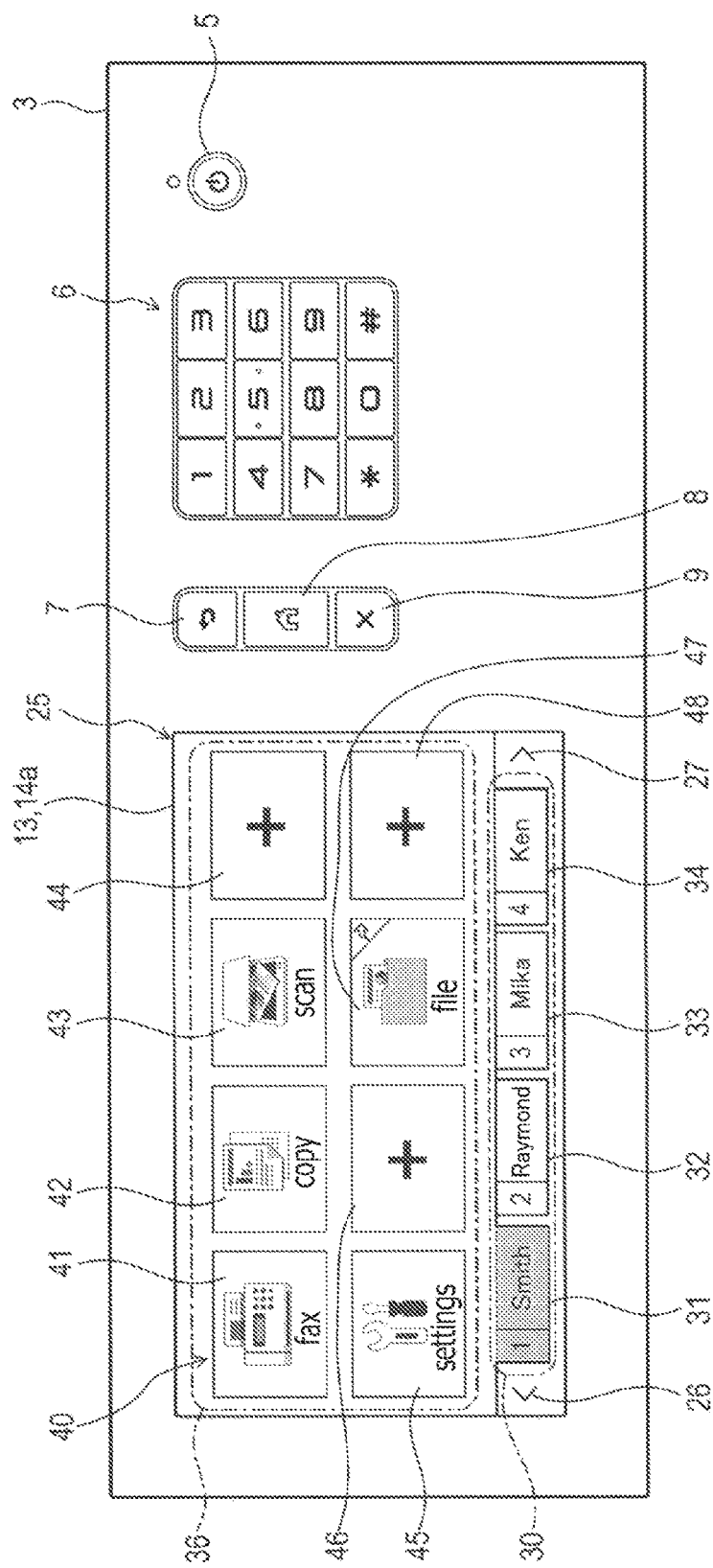
FIG. 2 illustrates an operation panel and a standby screen according to a first illustrative embodiment.

On one side surface of a housing (not shown) of the function execution device 10, an operation panel 3 is proved as shown in FIG. 2. On the operation panel 3, a power button 5, a numeric keypad 6, a return button 7, a home button 8, a stop button 9, a display 13 and a touch panel 14a. It is noted that the display 13 shown in FIG. 2 is configured such that a displaying device provided to the display 13 has an image display area. The touch panel 14a is arranged to overlaid on almost entire range of the image display area.

The power button 5 is a hard key operated by the user to turn ON/OFF the power of the function execution device 10. When the power button 5 is depressed, the power is supplied to the function execution device 10 and the function execution device 10 start operating, the controller 11 executes a particular initialization process, and then displays a standby screen 25 on the display 13. By performing input operations with the standby screen 25 as a starting point, the user can switch the screens displayed on the display 13, make various settings, and cause the function execution device 10 to execute various functions.

The numeric keypad 6 is a collective name of multiple hard keys including number keys of "0"-"9" which are operated by the user mainly when numbers are input when, for example, a destination facsimile number of facsimile data is input or the number of copies is input when the copy function is used.

According to the illustrative embodiment, the numeric keypad 6 includes, as shown in FIG. 2, 12 hard keys consisting of ten hard keys corresponding to 10 numerals "0"-"9", and two hard keys corresponding to symbols "*" and "#".

The return button 7 is a hard key which is operated by the user when the user wishes to return the screen currently displayed on the display 13 to a screen immediately before switched to the current screen. The home button 18 is a hard key to be operated by the user when the user wishes to display the standby screen 25 on the display 13. The stop button 9 is a hard key operated by the user when the user wants to stop the currently executed operation.

(1-3) Description on Standby Screen

The standby screen 25 is of a so-called tabbed multi-screen form, and a page corresponding to the selected one of multiple tabs is displayed in the standby screen 25. Specifically, the multiple tabs are associated with respective pages (tab screens), and one of the tab screens corresponding to the selected tab is displayed in the standby screen 25.

It is noted that information necessary to display the standby screen such as image information for respective tabs and information on icons included in respective tab screens associated with respective tabs, and information regarding contents of processes to be executed when input operations, through the input part 15, with respect to the standby screen 25 are performed is stored in the storage 12.

As shown in FIG. 2, the standby screen 25 has a tab display area 30 and a tab screen display area 36. In the tab display area 30, at most four tabs are displayed. According to the illustrative embodiment, the total number Nt of the tabs is greater than the maximum number (4) of the tabs which can be simultaneously displayed in the tab display area 30. FIG. 2 shows an example in which 1st tab 31, 2nd tab 32, 3rd tab 33 and 4th tab 34 among 1st-Nt-th tabs are displayed in the tab display area 30. In the following description, as an example, a case where Nt equals to 8 will be described.

In the vicinities of both ends of the tab display area 30, in the standby screen 25, a right button 27 and a left button 26 are displayed. It is noted that an arranging order in the right-left direction of Nt tabs is determined in advance. When there exists another tab on the left side of the currently displayed four tabs, by tapping the left button 26, the currently displayed four tabs are scrolled rightward, thereby the tab on the left side with respect to the 1st tab 31 will be displayed in the tab display area 30. In contrast, the rightmost tab (i.e., the 4th tab 34) of the currently displayed four tabs will disappear as they are scrolled rightward. Similarly, when there exists a tab on the right side with respect to the currently displayed four tabs, by tapping the right button 27 to scroll the currently displayed four tabs leftward, the tab arranged on the right side with respect to the 4th tab 34 will be displayed within the tab display area 30, while the leftmost tab 31 will disappear when the four tabs are scrolled leftward.

When the tab screen corresponding to the currently selected tab is switched to another tab screen corresponding to anther tab, another should be tapped. When one of the tabs other than the currently selected tab is tapped, the tapped tab is in the selected state, and in the tab screen display area 36 of the standby screen 25, the tab screen corresponding to the tab newly set to the selected state is displayed.

The tab in the selected state is displayed in a manner different from the other tabs. As an example of the different manner, for example, the tab in the selected state may be displayed in a color different from the colors of the other tabs, the tab in the selected state may be displayed to be larger than the other tabs, the tab in the selected state may be displayed with a particular decoration and the like. FIG. 2 shows a case where the first tab 31 is in the selected state, and the first tab 31 is displayed in a color different from the color of the other tabs.

The tabs are assigned with tab names, respectively. On the standby screen 25, the tab names corresponding to the respective tabs are displayed. In the example shown in FIG. 2, a tab name "Smith" is displayed on the first tab 31, a tab name "Raymond" is displayed on the second tab 32, a tab name "Mika" is displayed on the third tab 33, and a tab name "Ken" is displayed on the fourth tab 34. It is noted that tab names are assigned to the other tabs (i.e., fifth-Nt-th tabs) which are not displayed on the standby screen 25 shown in FIG. 3.

According to a factory default setting of the function execution device 10, that is, when the function execution device 10 is firstly used by the user, each tab is assigned with a particular tab name as an initial value of the tab name. The user can change the tab names.

Further, to each tab, a tab number is assigned in addition to the tab name According to the illustrative embodiment, to an n-th tab, a tab number n is assigned. Thus, number "1" is assigned to the first tab, number "2" is assigned to the second tab, and etc.

There is a case where the tab numbers are added to the tab names in the tabs displayed in the standby screen 25. FIG. 2 shows an example of such a case, and tab numbers 1-4 are assigned to the tabs 31-34, respectively. It is noted that whether the tab numbers are added to the tabs displayed on the standby screen 25 or only the tab names are displayed (without the tab numbers) depends on a setting state of the custom transition mode, which will be described later.

The tab screen associated with each tab is a screen on which multiple icons are arranged. According to the illustrative embodiment, 8 icons (i.e., a first icon 41—an eighth icon 48) are displayed in one tab screen. In the tab screen area 36 of the standby screen 25, among tab screens (i.e., a first tab screen through an Nt-th tab screen) respectively corresponding to the Nt tabs (i.e., the first tab—the Nt-th tab), one corresponding to one tab which is in the selected state is displayed. FIG. 2 shows a case where the first tab screen 40 which is a tab screen associated with the first tab 31, which is in the selected state.

The icons displayed in the tab screen of the standby screen 25 includes, when generally categorized, three kinds of icons. Specifically, the three kinds of icons are function execution icons, setting icons, and unregistered icons. The function execution icons are icons to which functions, among the multiple functions the function execution device 10 has), to be executed are assigned, respectively. The setting icons are icons to which a particular item subjected to be set, or lists of multiple icons subjected to be set are assigned. The unregistered icons are icons to which no functions or setting items are assigned, and user's arbitrary functions of setting items can be newly assigned thereto.

The function execution icons are further categorized in tow kinds of icons: specific function icons; and shortcut icons. The specific function icons are icons for executing functions the function execution device 10 has (i.e., the scan function, the print function, the copy function, the facsimile function, web service functions, convenient tool functions and the like), respectively, and the function subjected to be executed is assigned to each specific function icon. The specific function icons have been registered, in advance, as the factory default setting. Setting values assigned to the respective specific function icons are default values preliminarily set. It is noted that the user can confirm and/or change such a default value when the user taps the specific function icon to execute the assigned specific function.

To each of the shortcut icons, a shortcut to execute any of the specific functions in accordance with a particular execution condition the user set in advance can be assigned. The shortcut icons are not preliminarily registered as the factory default setting of the function execution device 10. The shortcut icon is generated when the user executes a registration operation to assign a shortcut with respect to an unregistered icon.

It is noted that, regarding the specific function icons, the initial values for respective setting items have been preliminarily determined. In contrast, regarding the shortcut icons, the user can register the function subjected to be executed, with setting conditions to execute the functions, arbitrarily.

It is noted that, regarding the unregistered icons, in addition to using them as the shortcut icons by assigning desired shortcuts as described above, they can be used as the specific function icons by assigning desired functions, and they can be used as the setting icons by assigning desired setting items.

In the standby screen 25 displaying the first tab screen 40 corresponding to the first tab 31 shown in FIG. 2, the first icon 41 is a fax (facsimile) icon. The fax icon is the specific function icon to execute the facsimile function. The second icon 42 is a copy icon, which is the specific function icon to execute the copy function. The third icon 43 is a scan icon, which is the specific function icon to execute the scan function. The fifth icon 45 is a setting menu icon, which is the setting icon to set a setting value of at least one setting item. The seventh icon 47 is the shortcut icon to which a shortcut of a "scan to file" function is assigned. The scan to file function is to transmit the image data scanned and generated by the function execution device 10 to another information processing device including a personal computer to make the personal computer store the transmitted image data in a designated folder of the image processing device. In the example shown in FIG. 2, the fourth icon 44, the sixth icon 46 and the eighth icon 48 are unregistered icons.

The types and position of eight icons included in the tab screen of each tab are determined as factory default values when the function execution device 10 is shipped from the factory. For example, for the first tab screen 40 corresponding to the first tab 31, as an initial value of each icon, the first icon 41 is set to the fax icon, the second icon 42 is set to the copy icon, the third icon 43 is set to the scan icon, the fifth icon 45 is set to the setting menu icon, and the other four icons 44, 46, 47 and 48 are set to be the unregistered icons. For each the tab screens corresponding to the tabs other than the first tab 31, initial values for eight icons are set.

According to the illustrative embodiment, the user is capable of perform editing operations for the icons included in the tab screens. Specifically, the user can change a position of an arbitrary one icon with a position of another icon. Further, the user can delete one or more icons other than the unregister icons so that they are replaced with unregistered icons. It is noted the replacement of icon positions can be performed not only within the same tab screen, but between different tab screens. That is, two icons on different tab screens can be replaced with each other.

Assignment of a function to the unregistered icon will be additionally described. When the unregistered icon is tapped, a list of functions and a list of setting items which can be assigned to the icon are displayed. The user may select, from the lists, a function or a setting item to be assigned to the icon.

When one of the setting items is selected, a setting icon corresponding to the selected setting item is newly generated. That is, the icon subject to the assignment is changed from the unregistered icon to the setting icon for the setting item as assigned. Thereafter, by tapping the setting icon, the user can check and change the setting value of the setting item.

When one of the functions is selected, another selection screen allowing the user to select whether the selected function is to be assigned to the icon to be registered as the specific function icon, or the shortcut icon.

When it is determined that the icon is registered as the specific function icon, a specific function icon corresponding to the selected function is newly generated. That is, the icon subject to be registered is changed to the unregistered icon to the specific function icon as registered this time. According to the illustrative embodiment, it is possible to register the specific function icon which has already been registered as the specific function setting can be registered again as another specific function icon.

When it is selected that icon is registered as the shortcut icon, a setting screen allowing the user to select on what execution condition the selected function is to be executed. The user can arbitrarily set the setting values of respective setting items necessary to cause the selected function to be executed (i.e., the execution condition) through the setting screen. When an operation of indicating completion of the setting, the shortcut icon executing the selected function in accordance with the particular execution condition. That is, the icon subject to registration is changed from the unregistered icon to the shortcut icon for executing the shortcut registered this time. Thus, by simply tapping the thus generated shortcut icon, it is possible to execute the registered function in accordance with the registered particular execution condition.

According to the above-described configuration, the user can register various icons with respect to the unregistered icons, and replace the positions of the icons in the tab screens arbitrarily. Accordingly, when there are multiple users of the function execution device 10, different tabs are assigned to respective users so that the each user can arrange suitable icons on the assigned tab screen arbitrarily.

In the standby screen 25 shown in FIG. 2, the tabs are assigned to different users, respectively. That is, the first tab screen 40 of the first tab 31 is the tab screen in which the arrangement of the icons and types of the icons are customized by a user whose name is "Smith". A second tab screen of the second tab 32 is a tab screen in which the arrangement of the icons and types of the icons are customized by a user whose name is "Raymond". A third tab screen of the third tab 33 is a tab screen in which the arrangement of the icons and types of the icons are customized by a user whose name is "Mike". A fourth tab screen of the fourth tab 34 is a tab screen in which the arrangement of the icons and types of the icons are customized by a user whose name is "Ken".

Alternatively or optionally, is may be possible to assign the types of the functions to the tabs so that icons are arranged by the types of the functions. For example, the specific function icons may be arranged on the first tab screen 40 corresponding to the first tab 31, the shortcut icons related only to the scan function may be arranged on the second tab screen corresponding to the second tab 32, and the shortcut icons related only to the copy function may be arranged on the third tab screen corresponding to the third tab 33. In such examples, unregistered icons may be included in the icons arrange on each tab screen.

(1-4) Sleep Mode and Custom Transition Mode

The controller 11 has, besides a normal operation mode, a sleep mode in which reduces a power consumption of the entire function execution device 10 is lower than in the normal operation mode. When the controller 11 controls the function execution device 10 to operate in the sleep mode, the display 13 is in the non-display state, and no image is displayed thereon. When the display 13 is, for example, an LCD, a backlight of the LCD is turned off when the function execution device 10 operates in the sleep mode. In the sleep mode, the power consumption of the controller 11 itself is reduced, and the various processes executed in the normal mode except for a particular process are stopped. Examples among the processes executed in the sleep mode include a process to detect that a sleep release condition is satisfied.

It is noted that a concrete mode to reduce the power consumption of the display 13 in the sleep mode needs not be limited to the above-described configuration, but can be determined appropriately. For example, the power consumption of the display 13 may be set to zero. Alternatively, the display 13 may not be set to the non-display state completely, but set to operate in a lower power consumption than in the normal mode, and may be controlled to display a message notifying the user that the image processing device 10 operates in the sleep mode.

When the power button 5 is turned on, the power is supplied and the function execution started 10 is started, the controller 11 causes the display 13 to display the standby screen 25. The contents of the standby screen 25 displayed when the function execution device 10 is started, that is, the tab screen to be initially displayed (i.e., the default standby screen) is determined in advance. According to the illustrative information, the first tab screen 40 of the first tab 31, that is, the tab screen corresponding to a tab of which name is "Smith" is set as the default standby screen.

The user can switch the contents of the standby screen 25 from the default standby screen to the standby screen displaying another tab screen by reselecting the tab. After the function execution device 10 is started and the particular sleep condition is satisfied, the controller 11 transits the operation mode to the sleep mode. Specifically, when a standby state in which no user operation has been kept for a particular period of time (e.g., for one minute), the controller 11 switches the standby screen 25 to the default standby screen. Thereafter, when the standby state of the function execution device 10 has been kept for a further particular period of time (e.g., for five minutes), the controller 11 transits the operation mode of the function execution device 10 to the sleep mode. According to the illustrative embodiment, the default standby screen is firstly displayed, and thereafter, the operation mode is changed to the sleep mode. Such a configuration may be modified such that the when the standby state has been kept for a particular period of time, the operation mode maybe immediately switched to the sleep mode.

When the function execution device 10 operates in the sleep mode, if a particular sleep release condition is satisfied, the sleep mode is released and the operation mode is recovered to the normal operation mode. When the operation mode is recovered from the sleep mode to the normal operation mode, the controller 11 displays the standby screen 25 on the display 13. As the sleep release condition, according to the illustrative embodiment, the touch panel 14a is tapped, anyone of the hard keys is depressed, or the like, is set.

The standby screen 25 which is displayed when the operation mode is recovered from the sleep mode to the normal operation mode is, basically, the default standby screen. It is noted, however, eight tabs and eight hard keys "1"-"8" among the hard keys of the numeric keypad 6 are associated with each other, respectively. That is, the tabs having the tab numbers "1"-"8" are associated with the hard keys "1"-"8", respectively.

Further, according to the illustrative embodiment, the function execution device 10 has the custom transition mode. According to the custom transition mode, when the operation mode is recovered from the sleep mode, the standby screen to be displayed on the display 13 is not the default standby screen, but the tab screen having the same tab number which is the same as the depressed one of the hard keys "1"-"8".

The custom transition mode can be enabled (ON) or disabled (OFF) by the user. When the custom transition mode is set to "OFF" (i.e. disabled), the standby screen displayed on the display is the default standby screen when the operation mode is recovered from the sleep mode to the normal operation mode.

In contrast, when the custom transition mode is set to "ON" (i.e., enabled), if one of the eight hard keys "1"-"8" of the numeric keypad 6 is depressed, the standby screen 25 having the tab screen of which tab number is the same as the number of the depressed hard key is displayed. When the hard key other than the hard keys "1"-"8" is depressed, the default standby screen is displayed.

When the custom transition mode is set to "ON" (i.e., enabled), on each tab displayed on the standby screen 25, as shown in FIG. 2, image information indicating the tab number is displayed as well as the tab name. According to the illustrative embodiment, the tab numbers and the hard keys of the same numbers "1"-"8" are associated with each other. The image information indicating the tab number is, in other words, the image information indicating the number of the hard keys with which the tab is associated.

According to the illustrative embodiment, as image information indicating the tab number, an image of an Arabic number is displayed. It is noted that the image information indicating the tab number may be determined arbitrarily, and the image information by be an image of a circled Arabic number, a Roman number, or the like.

(1-5) Description of Main Controlling Process

Next, referring to FIG. 3, a main control process executed by the controller 11 will be described. Specifically, when the user depressed the power button 5 to power on the function execution device 10 executed by the controller 11, the function execution device 10 starts operating in accordance with the normal operation mode, and executes the main control process shown in FIG. 3.

When the main control process is started, the controller 11 displays the default standby screen as the standby screen 25 on the display 13 in S110. In S120, the controller 11 determines whether the sleep condition is satisfied. When it is determined that the sleep condition is not satisfied (S120: NO), the controller 11 executes the normal process (S130), and returns the process to S120. It is noted that the normal operation is an operation executed in accordance with a user operation or a communication with external equipment if the user operation or the communication with external equipment has been executed. If the user operation or the external communication has not been executed and the standby state has been kept, the controller 11 maintains the standby state in S130 and returns the process to S120.

When it is determined that the sleep condition is satisfied (S120: YES), the controller 11 changes the operation mode to the sleep mode (S140). As the operation mode is changed to the sleep mode, the display 13 is in the non-display sate. In S150, the controller 11 determines whether a hard key is depressed. When it is determined that no hard key is depressed (S150: NO), the controller 11 determines whether the touch panel 15*a* is tapped (S160). When it is determined that the touch panel 14*a* is not tapped (S160: NO), the controller 11 returns the process to S150. When it is determined that the touch panel 14*a* is tapped (S160: YES), the controller 11 advances the process to S210.

In S210, the controller 11 recovers the normal operation mode from the sleep mode. Then, in S220, the controller 11 displays the default standby screen on the display 13, and returns the process to S120. When it is determined that a hard key is depressed (S150: YES), the controller 11 determines whether the custom transit mode is set to on (S170). When it is determined that the custom transit mode is set to off (S170: NO), the controller 11 advances the process to S210. In this case, the operation mode of the function execution device 10 is recovered to the normal operation mode and the default standby screen is displayed on the display 13.

When it is determined that the custom transit mode is set to on (S170: YES), the controller 11 determines whether the depressed hard key is a tab-registered key (S180). The tab-registered key is a hard key to which one of the tabs is associated. According to the illustrative embodiment, the tab registration keys are eight hard keys "1"-"8" among the hard keys of the numeric keypad 6.

When it is determined that the depressed hard key is a hard key other than the tab-registered keys (that is, the keys to which none of the tabs has been associated) (S180: NO), the controller 11 advances the process to S210. When it is determined that the depressed hard key is one of the tab-registered keys (S180: YES), the controller 11 recovers the normal operation mode from the sleep mode (S190). Then, the controller 11 displays the standby screen corresponding to the tab associated with the depressed hard key on the display 13 (S200), and the returns the process to S120. When, for example, the hard key "5" is depressed, the controller 11 displays the standby screen including the tab screen corresponding to the fifth tab of which tab number is "5" on the display 13.

(1-6) Custom Transit Mode Setting Process

Next, a custom transit mode setting process executed by the controller 11 will be described, referring to FIG. 4. When a particular user operation to set the custom transit mode, after the function setting device 10 is powered on, the controller 11 executes the custom transit mode setting process shown in FIG. 4.

Figure 4:
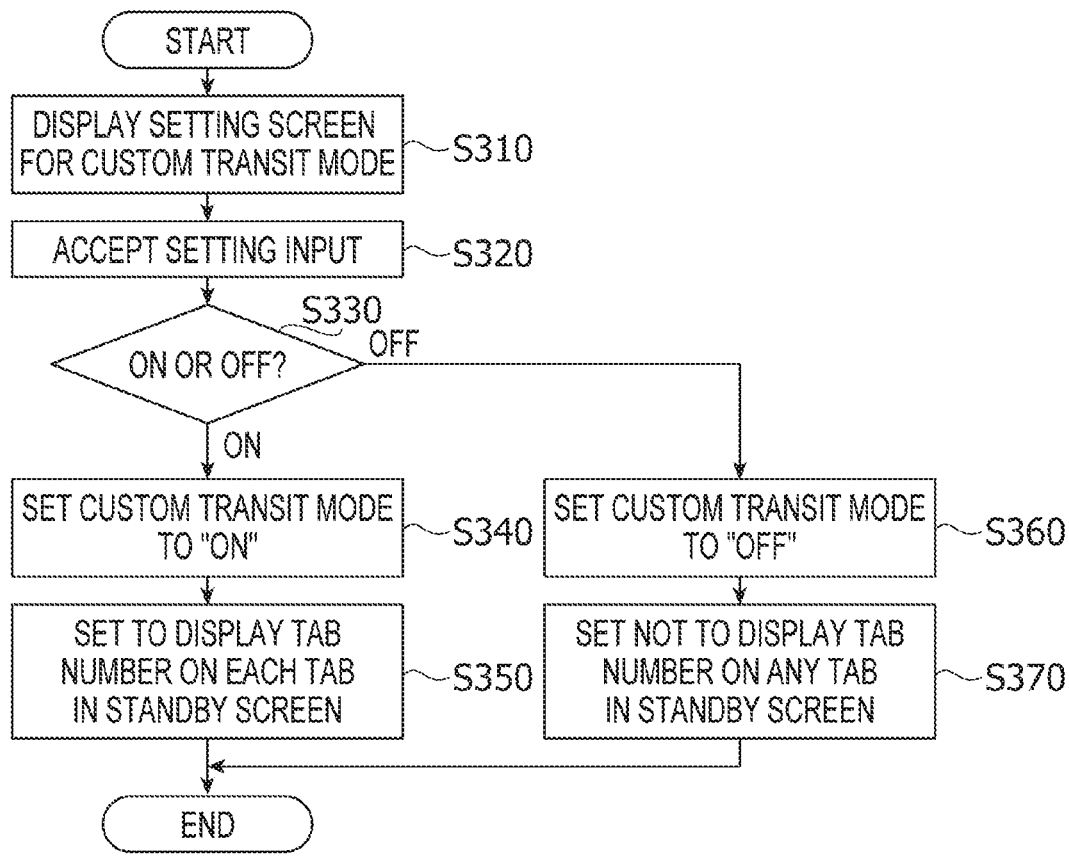
FIG. 4 is a flowchart illustrating a custom transition setting process according to the first illustrative embodiment.

When the custom transit mode setting process shown in FIG. 4 is started, the controller 11 displays a setting screen of the custom transit mode on the display 13 (S310). Then, the controller 11 accepts user operation to set the custom transit mode to "ON" or "OFF" with respect to the custom transit mode setting screen (S320).

In S330, the controller 11 determines, based on the user input accepted in S320, which of "ON" and "OFF" is input for the setting of the custom transit mode. When it is determined that the setting input to set the custom transit mode to "ON" (S330: ON), the controller 11 advances the process to S340. In S340, the controller 11 sets the custom transit mode to "ON". Then, in S350, the controller 11 applies settings, for each tab displayed in the standby screen, to display the tab name and the tab number.

When it is determined that the setting input to set the custom transit mode to "OFF" is made (S330: OFF), the controller 11 advances the process to S360. In S360, the controller 11 sets the custom transit mode to "OFF". Then, in S370, the controller 11 sets, for each tab displayed in the standby screen, not to display the tab number.

(1-7) Effects of First Illustrative Embodiment

According to the above-described first illustrative embodiment, following effects (1a)-(1d) can be achieved.

(1a) When the tab-registered key is depressed when the function execution device 10 operates in the sleep mode, the standby screen corresponding to the depressed tab-registered key, that is, the standby screen including the tab screen corresponding to the tab which is associated with the depressed tab-registered key is displayed on the standby screen. Therefore, when recovered from the sleep mode, a user-desired standby screen can be quickly displayed without requiring user's effort.

(1b) According to the first illustrative embodiment, the numeric keys of "1"-"8" are the tab-registered key. Further, the tab number is set to each tab, and the tabs are associated with the numeric keys having the same numbers set to the tabs, respectively. Therefore, the user can recognize the relationship between the numeric keys and the corresponding standby screens in advance. Accordingly, at a time of recovery from the sleep mode, the user can make the standby screen corresponding to the desired tab be displayed quickly by depressing the numeral key corresponding to the desired tab.

(1c) On each tab in the standby screen, image information indicative of the tab number is displayed as well as the tab name. Therefore, the user can recognize the relationship between the tab numbers and the standby screen in advance. Accordingly, the user can grasp, in advance, the relationship between the numeric keys to be depressed in the sleep mode and the standby screens displayed in response to depression of the numeric keys, respectively.

(1d) According to the first illustrative embodiment, the custom transit mode can be set to either "ON" or "OFF". Accordingly, when the custom transit mode is set to "OFF", when recovered from the sleep mode, regardless of the depressed hard key, the default standby screen is always displayed. In contrast, when the custom transit mode is set to "ON", when recovered from the sleep mode, the desired standby screen can be displayed quickly, without displaying the default standby screen.

It is noted that the function execution device 10 is an example of a display controlling device. The function to display the tab screen having the tab number corresponding to the numeral key which is depressed, in the sleep mode, to recover the normal operation mode from the sleep mode is an example of a key corresponding display function.

Figure 3:
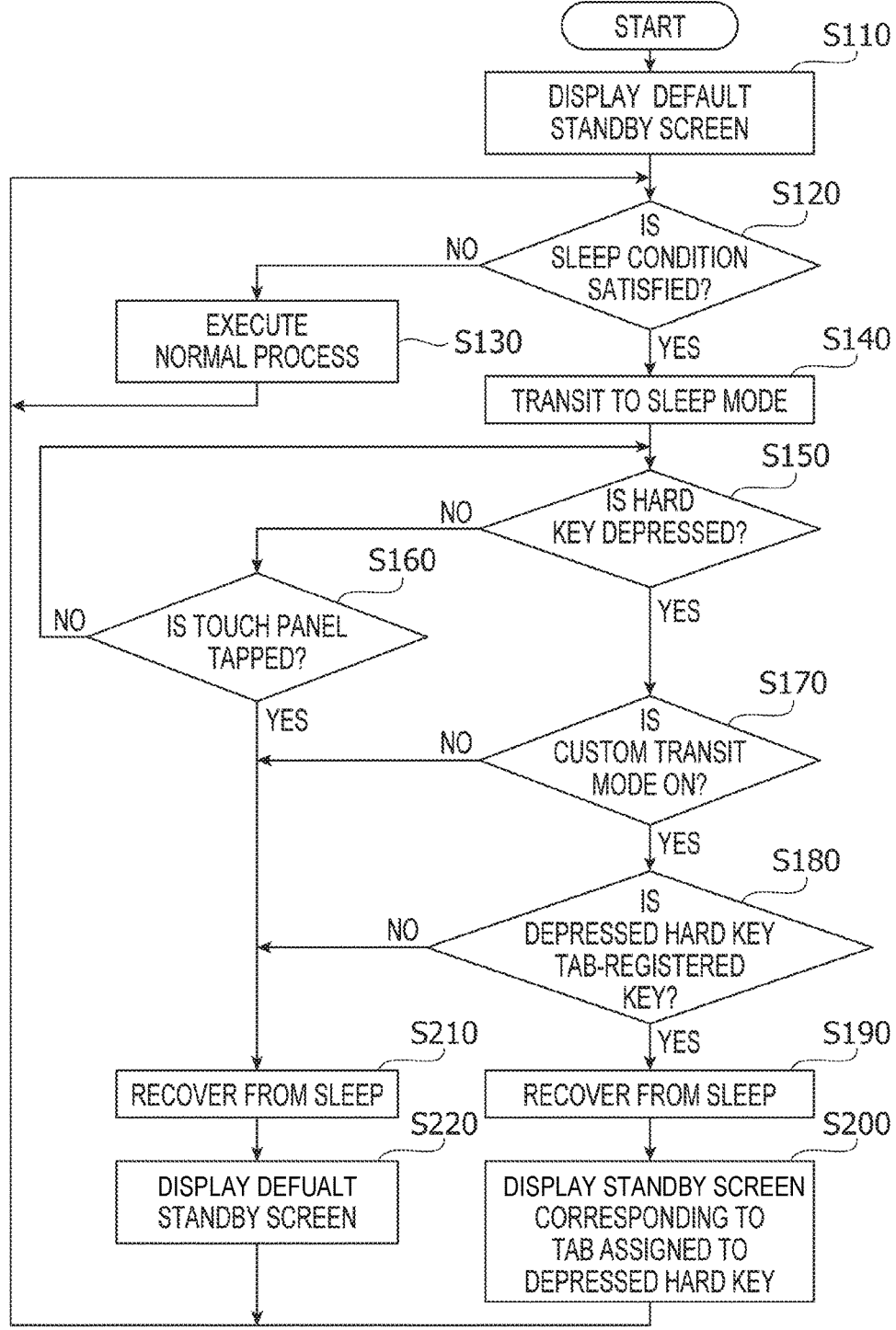
FIG. 3 is a flowchart illustrating a main control process according to the first illustrative embodiment.

Further, the processes of S110, S200 and S220 in the main control process shown in FIG. 3 are examples of a standby screen display process. The process in S140 is an example of a sleep transition process. The processes in S190 and S210 are examples of a sleep restoration process. In the custom transit mode setting process shown in FIG. 4, the process S320 is an example of a function setting acquiring process. Further, the setting input accepted in S320 is an example of a function setting operation.

2. Second Illustrative Embodiment

Figure 5:
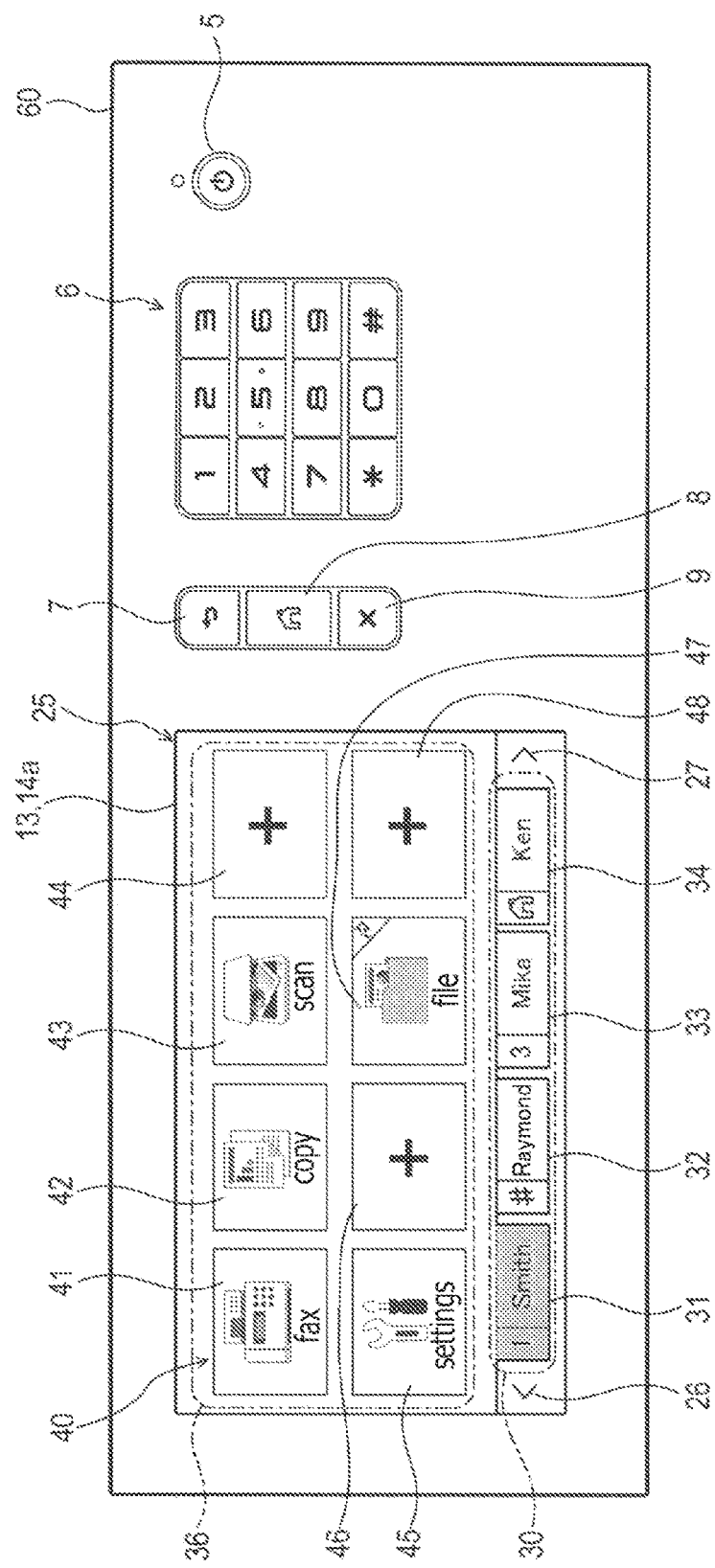
FIG. 5 illustrates an operation panel and a standby screen according to a second illustrative embodiment.

FIG. 5 shows the operation panel 60 displaying the standby screen according to a second illustrative embodiment. The operation panel 60 according to the second illustrative embodiment is the same as the operation panel 3 according to the first illustrative embodiment in terms of the hardware configuration. It is noted that the contents of the standby screen 25 shown on the display 13 according to the second embodiment are different from those according to the first illustrative embodiment. Specifically, the correspondence between the tabs and the hard keys is different between the first and the second illustrative embodiment.

According to the first illustrative embodiment, the tab numbers are determined in advance for respective tabs. In contrast, according to the second illustrative embodiment, the tab numbers for the respective tabs are not initially set.

Further, according to the second illustrative embodiment, the tabs and the hard keys are not associated with each other in the initial state. According to the second illustrative embodiment, a particular tab can be associated with a particular hard key by the user operation.

FIG. 5 shows a case where the first tab 31 is associated with the hard key for "1", the second tab 32 is associated with the hard key for "#", the third tab key 33 is associated with the hard key for "3", and the fourth tab 34 is associated with the home button 8.

According to the second illustrative embodiment, each tab can be associated with one of 12 hard keys of the numeric keypad 6, other hard keys 7, 8 and 9 except for the power button 5.

In the standby screen, on each tab that is associated with the hard key, image information indicating the associated hard key is displayed. The content of the image information indicating the hard key is stored, for respective hard keys, in the storage 12.

Figure 6:
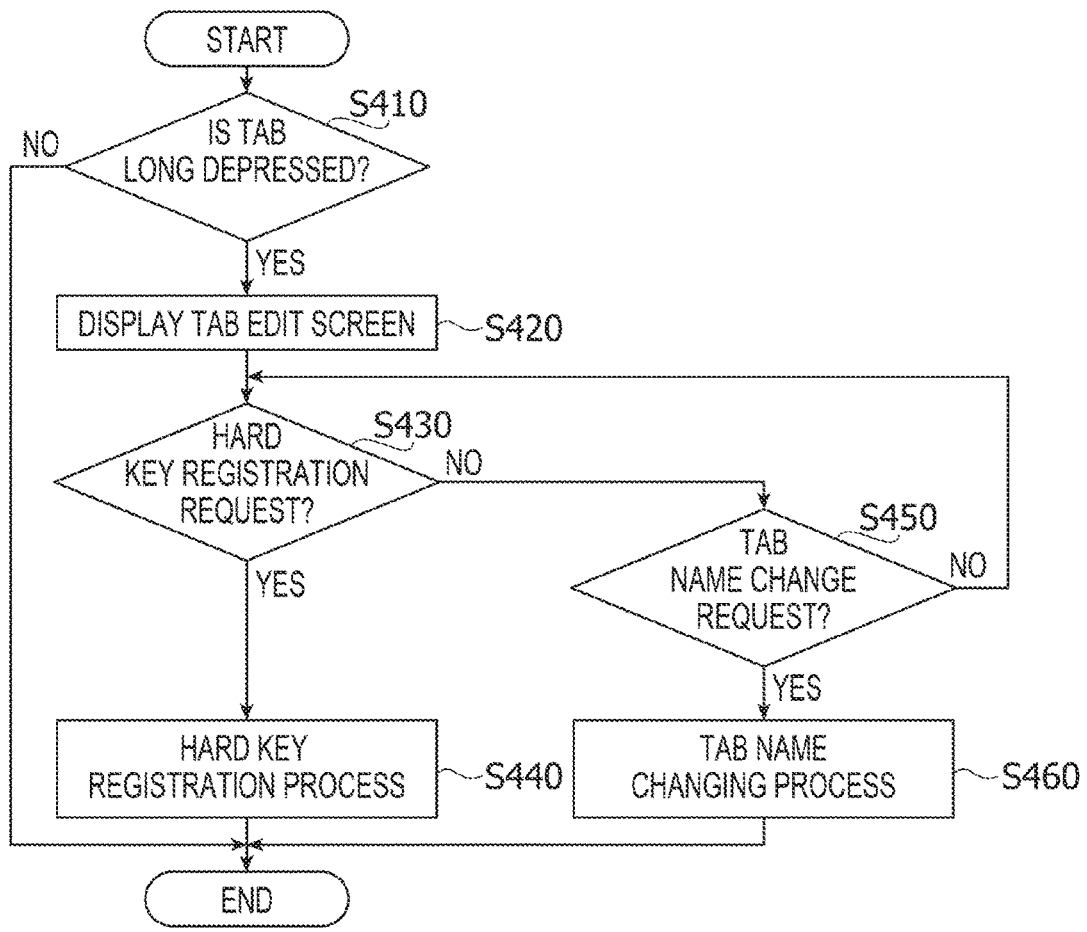
FIG. 6 is a flowchart illustrating a tab edit process according to the second illustrative embodiment.

A tab editing process executed by the controller 11 and enabling the above function will be described, referring to FIG. 6. A program realizing the tab editing process shown in FIG. 6 is stored in the storage 12. The controller 11 periodically executes the tab editing process shown in FIG. 6 when the standby screen is being displayed.

When the tab editing process shown in FIG. 6 is started, the controller determines whether one of the tabs displayed in the standby screen is long-depressed (S410). It is noted that, in the specification, a "long-depression" of the tab means that the tab is depressed, via the touch panel 14a, by the designation body continuously for more than to particular time period. When the tab is not long-depressed, the controller 11 terminates the tab editing process. When anyone of the tabs in the standby screen 25 has been long-depressed, the controller 11 advances the process to S420.

In S420, the controller 11 displays a tab edit screen on the display 13. It is noted that the tab edit screen through which, with respect to the tab which has been long-depressed and subjected to edition, the user can register association of the tab with one of the hard keys and/or change the name of the tab. That is, the user can edit the tab subjected to edition through the tab edit screen.

In S430, the controller 11 determines whether registration of the hard key is requested by the user. The request for registration of the hard key is done by, for example, a particular operation including depression of the hard key subjected to registration. When registration of the hard key is not being requested (S430: NO), the controller 11 advances the process to S450. When registration of the hard key is requested (S430: YES), the controller 11 advances the process to S440, and registration of the hard key is performed.

In S450, the controller 11 determines whether a tab name change request is made. The tab name change request is done by a particular operation including input of a new name of the tab by the user. When the tab name change is not being requested (S450: NO), the controller 11 returns the process to S430. When the tab name change is requested (S450: YES), the controller 11 advances the process to S460. In S460, the controller changes the name of the tab subjected to edit in accordance with the tab name change request made by the user.

In addition to registration of the hard keys, the above-described configuration may be modified such that registration of the hard key may be released. Further, when the hard key registration request is performed and another tab has already been associated with the designated (i.e., depressed) hard key, a notification indicating that the designated hard key has already been registered may be made for the user. Optionally, in response to such a notification, the user may select to register another key by depressing the same, or terminate the registration operation.

According to the above-described second illustrative embodiment, an effect indicated below can be achieved in addition to the effects same as those of the first illustrative embodiment.

According to the second illustrative embodiment, a tab can be associated with anyone of the hard keys. On each of the tabs associated with respective hard keys, the image information indicating the associated hard keys is displayed together with the tab names as in the first illustrative embodiment. Therefore, the user can recognize, in advance, the relationship between the hard keys to be depressed in the sleep mode and the standby screens displayed in response of depression of the standby keys, respectively.

By long-depressing one of the tabs displayed in the standby screen, the user can associate the long-depressed tab with one of the hard keys. Further, by the registration operation, the user can associate a particular tab to a particular hard key. For example, a tab may be associated with an unregistered hard key, or a tab associated with a certain hard key may be changed to another tab. According to such a configuration, operability is improved.

It is noted that S430 in FIG. 6 is an example of a registration acquiring process, and S440 in FIG. 6 is an example of a registration process.

3. Other Embodiments

It is noted that the aspects of the present disclosure need not be limited to the above-described configurations, and various modifications could be made.

(3-1) The function execution device 10 may be configured such that the custom transit mode is not provided, and when a hard key, which is associated with one of the tabs, is depressed in the sleep mode, the tab screen corresponding to the depressed hard key is always displayed.

(3-2) It is noted that the hard keys need not be limited to the hard keys of "6"-"9" shown in FIG. 2. Further, the display controlling device and method described above with reference to the function execution device 10 can be applied to any kind of equipment provided with a display and hard keys.

(3-3) The configuration may be modified such that one tab can be associated with a combination of a plurality of hard keys. For example, a particular tab may be associated with a number "12". Then, when the hard keys of "1" and "2" are depressed simultaneously when the function execution device 10 operates in the sleep mode, the controller 11 determines that number "12" is input, and may display the tab screen corresponding to the particular tab which is associated with the combination of the hard keys of "1" and "2". It is noted that the term "simultaneously" here does not intended to mean "exactly at the same time" but "there is a moment or a period where both are being depressed within a particular time frame even if depression timings of the plurality of keys are different".

(3-4) The number of icons arranged in one tab screen is eight according to the above-described embodiments. However, the number of icons in one tab screen needs not be limited to eight, but can be determined arbitrarily. Further, arrangement of the icons in each tab screen may be determined arbitrarily. It is also noted that the number of tabs simultaneously displayed in the tab display is four at the maximum according to the above-described embodiments. This configuration is only an example, and the number of tabs simultaneously displayed in the standby screen may be determined arbitrarily.

(3-5) The total number of tabs may be changeable. For example, in the above-described configuration, the total number of the tabs is fixed to be eight according to the factory default setting. However, such a configuration may be modified such that the total number the tabs can be changed to be greater than or less than eight by the user.

(3-6) Arrangement of the tabs and icons within the standby screen may be determined at user's discretion. For example, in the standby screen 25 shown in FIG. 2, the arrangement of the tab display area 30 and the tab screen display are 36 may be exchanged.

(3-7) It is noted that the facsimile function, the scan function, the copy function, the print function, the web service function and the like, which can be executed by the function execution device, are only examples of various functions. The function execution device may be configured to execute such that functions different from those described above may be executable. Further, the types of the functions, the number of the functions executable by the function execution device may be determined appropriately.

(3-8) It is noted the above-described embodiments may be modified such that one or a plurality of functions of one of the component of the above-described embodiment may be realized by a plurality of components. Further, one or a plurality of functions realized by one component may be realized by a single component. Further, a part of the configuration of the above-described embodiments may be omitted. Any aspects included in technical ideas set forth the claims and the present disclosures should be regarded embodiments according to the present disclosures.

It is noted that settings made by the user, such as the association of the tabs and the hard keys, association of icons with the functions and the like set by the user, may be stored in the NVRAM included in the storage 12 as registration data, while default settings of the above may be stored in the ROM of the storage 12.

What is claimed is:
1. A display controlling device, comprising:
a display;
an input part including multiple hard keys; and
a controller configured to:
  display a standby screen on the display, the standby screen including multiple tabs, one of which is selectable, and a tab screen corresponding to a selected one of the multiple tabs, at least one of the multiple hard keys serving as a tab-registered key which is associated with one of the multiple tabs;
  operate the display controlling device in a sleep mode in which the standby screen is not displayed on the display;
  in response to a particular sleep condition being satisfied, change an operation mode of the display controlling device to the sleep mode; and
  in response to depression of the tab-registered key when the operation mode of the display controlling device is the sleep mode, recover from the sleep mode with displaying the standby screen including the tab screen corresponding to the tab associated with the depressed tab-registered key on the display.

2. The display controlling device according to claim 1, wherein the tab displayed in the standby screen and associated with the tab-registered key includes image information indicating the tab-registered key.

3. The display controlling device according to claim 2, wherein the multiple hard keys include numeric keys respectively indicating integers 0-9, and
wherein the multiple tabs displayed in the standby screen and associated with the numeric keys include the image information indicating the associated one of the numeric keys.

4. The display controlling device according to claim 3, wherein tab numbers, which are different integers, are assigned, in advance, to the multiple tabs, respectively,
wherein at least one of the numeric keys is the tab-registered key, and
wherein the numeric key serving as the tab-registered key is associated with the tab assigned with the integer same as the number of the numeric key.

5. The display controlling device according to claim 1, wherein the controller is further configured to:
accept a registration operation to associate one of the multiple hard keys with one of the multiple tabs through the input part; and
register the associated relationship between the one of the multiple hard keys with the one of the multiple tabs based on the accepted registration operation.

6. The display controlling device according to claim 1, wherein the controller is further configured to:
accept a function setting operation, the function setting operation being an operation to enable or disable a key corresponding display function to display the standby screen corresponding to the tab-registered key when the sleep mode is changed by depression of the tab-registered key; and
display the standby screen including the tab screen corresponding to the tab associated with the tab-registered key when the key corresponding display function is enabled, while display a particular standby screen, which is determined in advance, when the key corresponding display function is disabled.

7. The display controlling device according to claim 1, wherein the multiple tabs are associated with different users, and wherein the tab screen corresponding to the selected one of the multiple tabs is for one of the different users.

8. The display controlling device according to claim 7, wherein the tab screen corresponding to the selected one of the multiple tabs comprising a plurality of different icons, the icons being respectively associated with at least one function, wherein the one of the different users selects the icons for the tab screen.

9. A method of controlling a display controlling device having a display and multiple hard keys, the method comprising:
displaying a standby screen on the display, the standby screen including multiple tabs, one of which is selectable, and a tab screen corresponding to a selected one of the multiple tabs, at least one of the multiple hard keys serving as a tab-registered key which is associated with one of the multiple tabs;
operating the display controlling device in a sleep mode in which the standby screen is not displayed on the display;
in response to a particular sleep condition being satisfied, changing an operation mode of the display controlling device to the sleep mode; and
in response to depression of the tab-registered key when the operation mode of the display controlling device is the sleep mode, recovering from the sleep mode with displaying the standby screen including the tab screen corresponding to the tab associated with the depressed tab-registered key on the display.

10. The method of claim 9, wherein the multiple tabs are associated with different users, and wherein the tab screen corresponding to the selected one of the multiple tabs is for one of the different users.

11. A non-transitory computer-readable recording medium for a display controlling device having a display, an input part including multiple hard keys, and a controller,
the recording medium storing computer-readable instructions which cause, when executed by the controller, the display controlling device to:
display a standby screen on the display, the standby screen including multiple tabs, one of which is selectable, and a tab screen corresponding to a selected one of the multiple tabs, at least one of the multiple hard keys serving as a tab-registered key which is associated with one of the multiple tabs;
operate the display controlling device in a sleep mode in which the standby screen is not displayed on the display;
in response to a particular sleep condition being satisfied, change an operation mode of the display controlling device to the sleep mode; and
in response to depression of the tab-registered key when the operation mode of the display controlling device is the sleep mode, recover from the sleep mode with displaying the standby screen including the tab screen corresponding to the tab associated with the depressed tab-registered key on the display.

12. The non-transitory computer-readable recording medium according to claim 11, wherein the multiple tabs are associated with different users, and wherein the tab screen corresponding to the selected one of the multiple tabs is for one of the different users.

13. A display controlling device, comprising:
a display;
an input part including multiple hard keys; and
a controller configured to:
display a standby screen on the display, the standby screen including selectable multiple tabs, the selectable multiple tabs respectively corresponding to multiple tab screens, one of the multiple tab screens corresponding to a selected one of the multiple tabs being displayed on the display, the multiple tabs including a first tab and a second tab, the multiple tab screens including a first tab screen and a second tab screen, the first tab and the second tab corresponding to the first tab screen and the second tab screen, respectively, the multiple hard keys including at least a first registered key and a second registered key which is different from the first registered key, the first registered key and the second registered key being associated with the first tab and the second tab, respectively;
operate the display controlling device in a sleep mode in which the standby screen is not displayed on the display;
in response to a particular sleep condition being satisfied, change an operation mode of the display controlling device to the sleep mode;
in response to depression of the first registered key when the operation mode of the display controlling device is the sleep mode, recover from the sleep mode with displaying the standby screen including the first tab screen, and in response to depression of the second registered key when the operation mode of the display controlling device is the sleep mode, recover from the sleep mode with displaying the standby screen including the second tab screen.

14. The display controlling device according to claim 13, wherein the first tab is associated with a first user and the second tab is associated with the second user and the first tab screen which corresponds to the first tab is for the first user and the second tab screen which corresponds to the second tab is for the second user.

15. The display controlling device according to claim 14, wherein the first tab screen comprising a plurality of different icons, the icons being respectively associated with at least one function, wherein the first user selects the icons for the first tab screen.

16. The display controlling device according to claim 13, wherein the tabs displayed in the standby screen and respectively associated with at least the first registered key and the second registered key include image information respectively indicating at least the first registered key and the second registered key.

17. The display controlling device according to claim 16, wherein the multiple hard keys include numeric keys respectively indicating integers 0-9, and wherein the multiple tabs displayed in the standby screen and associated with the numeric keys include the image information indicating the associated one of the numeric keys.

18. The display controlling device according to claim 17, wherein tab numbers, which are different integers, are assigned, in advance, to the multiple tabs, respectively, wherein at least one of the numeric keys is the first registered key, and wherein the first tab is assigned with the integer same as the number of the numeric key.

19. The display controlling device according to claim 13, wherein the controller is further configured to:

accept a registration operation to respectively associate the first registered key and the second registered key with the first tab and the second tab through the input part, respectively; and register the associated relationship between the first registered key with the first tab and the second registered key with the second tab based on the accepted registration operation.

20. The display controlling device according to claim 13, wherein the controller is further configured to:

accept a function setting operation to enable or disable a key corresponding display function to display the standby screen corresponding to the first registered key or the second registered key when the sleep mode is changed by depression of the first registered key or the second registered key; and display the standby screen including the tab screen corresponding to the tab associated with the first registered key or the second registered key when the key corresponding display function is enabled, while display a particular standby screen, which is determined in advance, when the key corresponding display function is disabled.

* * * * *